2,762,542

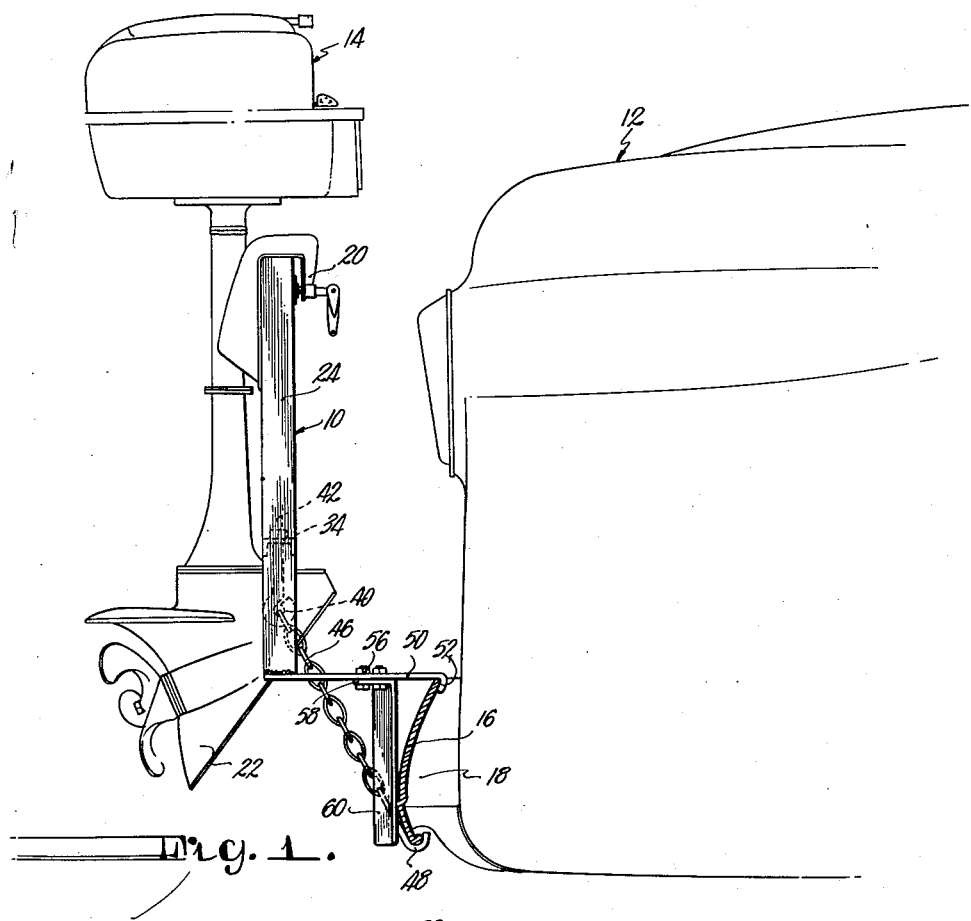
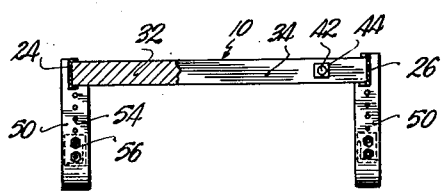
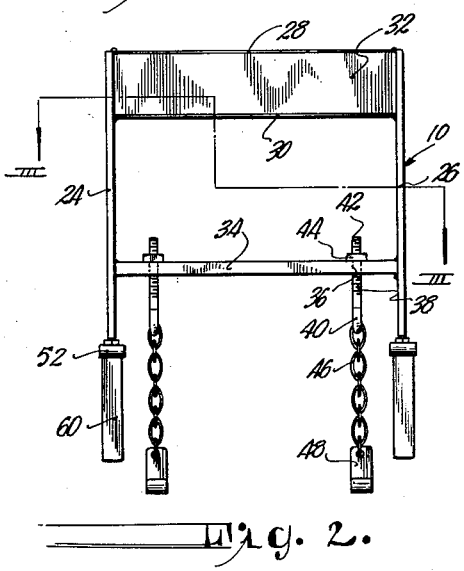
Sept. 11, 1956    R. C. HODGEMAN    2,762,542
AUTOMOBILE CARRIER RACK
Filed Oct. 4, 1954
Fig. 1.
Fig. 2.
Fig. 3.
INVENTOR.
Raymond C. Hodgeman
BY
ATTORNEY.

AUTOMOBILE CARRIER RACK

Raymond C. Hodgeman, Hardin, Mo., assignor to Webb Engineering Co., Kansas City, Kans., a partnership Application October 4, 1954, Serial No. 459,908

1 Claim. (Cl. 224—42.03)

This invention relates to the field of carrier racks for motor vehicles and, more particularly, to such a rack for carrying an outboard motor upon an automobile.

The primary object of this invention is to provide a carrier rack which may be quickly and easily installed upon or removed from the bumper of an automobile and which is adapted to receive an outboard motor in such manner that the motor may be releasably locked to the rack by the motor's own mounting clamps for holding the motor in a position out of engagement with both the automobile and the ground.

It is another important object of this invention to provide simple, convenient and positive acting structure for detachably mounting such a rack upon the bumper of an automobile by means including flanged members hooked over the top edge of the bumper, depending elements abutting the outward face of the bumper and extensible structure adapted to be hooked around the lower edge of the bumper.

Other important objects of this invention, including important details of construction, will be made clear or become apparent as the following specification progresses, reference being made to the accompanying drawing wherein:

Fig. 1 is a substantially side elevational view of the carrier rack which is the subject of this invention installed upon the bumper of an automobile and having an outboard motor clamped thereon in travelling position, the automibile being shown only fragmentarily with the bumper of the latter being illustrated in section;

Fig. 2 is a front elevational view of the carrier rack itself; and

Fig. 3 is a cross sectional view of the carrier rack taken on line III—III of Fig. 2.

Referring first to Fig. 1, the numeral 10 generally designates the carrier rack forming the subject matter of this invention, while the numeral 12 generally indicates a motor vehicle and the numeral 14 generally indicates an outboard motor. Vehicle 12 is illustrated as conventionally provided with a rear bumper 16 mounted thereon by brackets or the like 18. It may be noted that bumper 16 is elongated and provided with upper and lower edges and front and rear faces. Motor 14 includes a number of releasable mounting clamps ordinarily used for mounting the motor 14 upon a boat and also includes a depending portion 22 which must be held out of engagement with the ground during transportation over land to prevent damage to the motor 14.

Rack 10 includes a pair of elongated, parallel, upright posts 24 and 26 which may preferably be formed of channel iron as shown in Fig. 3. Posts 24 and 26 are interconnected by an elongated, uppermost cross element 28 extending between posts 24 and 26 and welded or otherwise suitably interconnected with each of the latter adjacent their uppermost ends. Spaced below cross element 28 and substantially parallel thereto is a second elongated, cross element 30 which extends between posts 24 and 26 and is welded or otherwise suitably secured to each of the latter at each of its ends. Between cross elements 28 and 30 is provided an elongated cross panel 32 preferably formed of wood and of a thickness such as to cooperate with the clamps 20 of an outboard motor 14 for receiving such clamps 20 in substantially the same manner as same are received by the motor mounting portion of a boat. Cross panel 32 has its ends confined within the channels of posts 24 and 26 and is prevented from moving longitudinally of posts 24 and 26 by the confining cross elements 28 and 30. If desired, a bolt or the like (not shown) may be passed through cross element 28, cross panel 32 and a cross element 30 for further rigidity.

Below cross element 30 and intermediate the ends of posts 24 and 26 although preferably closer to their lower ends than their upper ends, is provided an elongated cross piece 34 which is welded or otherwise suitably secured at its ends to posts 24 and 26 respectively. Cross piece 34 is provided with a pair of vertical holes 36 through each of which is passed an eye bolt 38 having its eye portion 40 below cross piece 34 and a portion 42 upon which is screwed a nut 44 extending above cross piece 34. Secured in the eye portion 40 of each bolt 38 is one end of an elongated chain 46 having a hook 48 secured on its opposite end.

Extending perpendicularly in one direction from each of posts 24 and 26 is an elongated member 50 welded at one end thereof to the lowermost end of a corresponding post 24 or 26 and provided at its opposite end with a downturned flange 52 adapted to hook over the upper edge of bumper 16 of vehicle 12. Each of members 50 is provided intermediate its ends with a number of perforations 54 for receiving fastening means such as bolts 56 for holding the shorter leg 58 of an L-shaped element 60 secured to member 50 with the longer leg of the element 60 depending therefrom and adapted to abut against the face of bumper 16 remote from vehicle 12 when flange 52 is hooked over the uppermost edge of bumper 16. It may be noted that each depending element 60 is mounted adjacent the ends of its supporting member 50 so as to present a pair of substantially T-shaped assemblies upon which posts 24 and 26 are mounted.

In operation, the carrier rack 10 may be emplaced upon the vehicle 12 by positioning the members 50 in overlying relationship to the upper edge of bumper 16 with the flanges 52 engaging the face of bumper 16 adjacent the vehicle 12. Depending elements 60 may then be adjusted along the lengths of members 50 by the positioning of fastening means 56 in appropriate perforations 54 so that element 60 will abut against the face of bumper 16 remote from vehicle 12 in such manner as to maintain members 50 substantially horizontal and posts 24 and 26 substantially vertical. The hooks 48 may then be positioned so as to engage the lower edge and a portion of the face of bumper 16 adjacent the automobile and nuts 44 may be screwed upon portions 42 of eye bolts 38 to tighten the chains 46 until the carrier rack 10 is firmly held in place upon the bumper 16. Obviously, the rack 10 may be removed from bumper 16 in only a moment by reversing the procedure mentioned for installation. When the carrier rack 10 is in place upon the vehicle 12, the outboard motor 14 may be securely but releasably held thereon by emplacing the clamps 20 in overriding relationship to the cross element 28 and then tightening the screw portion of the clamp in the same manner as is followed in affixing the motor 14 upon the rear of a motorboat.

It will now be apparent that this invention provides a simple, inexpensive, convenient and entirely reliable structure for use in accomplishing the objects hereinbefore set forth. Manifestly, certain minor modifications and changes could be made from the exact details of construction described without materially departing from the true spirit and intention of the invention. Accordingly, it is desired to be limited only by the scope of the appended claim.

Having thus described the invention, what is claimed as new and desired to be secured by Letters Patent is:

For use in carrying an outboard motor provided with mounting clamps upon a motor vehicle provided with a bumper having an upper edge, a lower edge and a pair of opposed faces of which one is proximate to and the other remote from the vehicle, a detachable carrier comprising, in combination, a pair of elongated, upright posts; a cross panel mounted on and extending between the posts adjacent the uppermost ends of the latter; a cross piece extending between and interconnecting the posts intermediate the ends of the latter, said cross piece having a hole therein adjacent each extremity thereof respectively; a pair of members respectively extending in one direction from the lowermost end of a corresponding post; a downturned flange on each member respectively at the extremity thereof remote from said corresponding post; an element depending from each member respectively intermediate the extremities of the latter; an eye bolt extending through each of said holes respectively and having its eye portion below the cross piece; a nut adjustable on each eye bolt respectively above the cross piece; an elongated chain attached at one end thereof to the eye portion of each eye bolt respectivly; and a hook on the opposite end of each chain respectively, said cross panel being adapted to receive said clamps for holding the motor, said members being adapted to rest upon the upper edge of the bumper, said flanges being adapted to engage the face of the bumper proximate the vehicle, said elements being adapted to engage the face of the bumper remote from the vehicle, and said hooks being adapted to engage the lower edge of the bumper and the face of the latter proximate the vehicle, whereby the carrier may be releasably mounted on the vehicle and the motor thereby carried by the vehicle without any parts of the motor engaging any parts of the vehicle or the ground.

References Cited in the file of this patent

UNITED STATES PATENTS

| | | |
|---|---|---|
| 1,367,654 | Borden | Feb. 8, 1921 |
| 1,586,939 | Bement | June 1, 1926 |
| 2,439,707 | Wright | Apr. 13, 1948 |
| 2,592,050 | McCharen | Apr. 8, 1952 |